United States Patent
Mai

(10) Patent No.: US 12,309,213 B2
(45) Date of Patent: May 20, 2025

(54) DETECTING VIOLATIONS IN VIDEO CONFERENCING

(71) Applicant: Cisco Technology, Inc., San Jose, CA (US)

(72) Inventor: Lan Betty Ngoc Mai, Shoreline, WA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/900,287

(22) Filed: Aug. 31, 2022

(65) Prior Publication Data
US 2024/0073264 A1 Feb. 29, 2024

(51) Int. Cl.
*H04L 65/4038* (2022.01)
*H04L 12/18* (2006.01)

(52) U.S. Cl.
CPC ...... *H04L 65/4038* (2013.01); *H04L 12/1822* (2013.01)

(58) Field of Classification Search
CPC .......... H04L 65/4038; H04L 12/1822
See application file for complete search history.

(56) References Cited

U.S. PATENT DOCUMENTS

| | | | | |
|---|---|---|---|---|
| 8,789,094 B1 * | 7/2014 | Singh | ............... | H04N 21/4788 725/62 |
| 9,503,456 B1 | 11/2016 | Lingberg et al. | | |
| 9,967,520 B1 * | 5/2018 | Rensburg | ............ | H04L 12/1822 |
| 9,992,330 B1 * | 6/2018 | Hodge | ............ | H04M 3/38 |
| 10,007,405 B2 * | 6/2018 | D'Amore | ............ | G06Q 10/101 |
| 11,562,657 B1 * | 1/2023 | Fieldman | ............ | G09B 5/14 |
| 11,632,258 B1 * | 4/2023 | Libin | ............ | G06F 3/165 709/204 |
| 11,836,756 B1 * | 12/2023 | Pugh | ............ | G06F 9/451 |
| 2007/0150583 A1 * | 6/2007 | Asthana | ............ | G06Q 10/06 709/224 |
| 2008/0215682 A1 * | 9/2008 | Vilis | ............ | H04L 63/101 709/204 |
| 2009/0006856 A1 * | 1/2009 | Abraham | ............ | G06F 21/55 713/183 |
| 2010/0005099 A1 | 1/2010 | Goodman et al. | | |
| 2010/0220845 A1 * | 9/2010 | Oliver | ............ | H04M 3/56 379/202.01 |
| 2011/0029935 A1 * | 2/2011 | Snyder | ............ | G06Q 10/10 715/863 |
| 2013/0145284 A1 * | 6/2013 | Anantharaman | ....... | G06F 21/10 715/753 |

(Continued)

FOREIGN PATENT DOCUMENTS

| | | | | |
|---|---|---|---|---|
| CN | 107005550 | * | 8/2017 | ......... G06F 3/04842 |
| EP | 3 024 195 | * | 5/2016 | ............. H04N 7/152 |

*Primary Examiner* — Madhu Woolcock
(74) *Attorney, Agent, or Firm* — Edell, Shapiro & Finnan, LLC

(57) ABSTRACT

Methods are provided in which a collaboration server connects at least two participants via respective user devices to a collaboration session. The collaboration server further detects a violation occurring during the collaboration session. The violation indicates an inappropriate activity or content from a participant of the at least two participants. Based on detecting the violation, the collaboration server performs at least one mitigating action in connection with the collaboration session.

24 Claims, 7 Drawing Sheets

(56) References Cited

U.S. PATENT DOCUMENTS

| | | | |
|---|---|---|---|
| 2014/0114895 A1* | 4/2014 | Beechum | G06Q 10/107 706/46 |
| 2015/0121456 A1* | 4/2015 | Milman | H04L 63/10 726/3 |
| 2015/0271206 A1 | 9/2015 | Schultz et al. | |
| 2017/0134696 A1 | 5/2017 | Moody et al. | |
| 2018/0027006 A1* | 1/2018 | Zimmermann | H04L 63/0227 726/11 |
| 2018/0248889 A1* | 8/2018 | Deninno | H04L 63/105 |
| 2018/0276895 A1* | 9/2018 | Hodge | G09G 5/003 |
| 2020/0244711 A1* | 7/2020 | Engel | H04L 65/60 |
| 2020/0287945 A1 | 9/2020 | Weinwurm et al. | |
| 2021/0125192 A1* | 4/2021 | Beaver, III | G06Q 30/0621 |
| 2021/0142335 A1* | 5/2021 | Riffert | G06Q 30/0609 |
| 2021/0306172 A1* | 9/2021 | Christensen | H04L 12/1831 |
| 2021/0399911 A1* | 12/2021 | Jorasch | H04L 12/1822 |
| 2022/0021680 A1* | 1/2022 | Roedel | H04N 7/155 |
| 2022/0021724 A1* | 1/2022 | Sivakumar | H04L 65/401 |
| 2022/0096937 A1* | 3/2022 | Dorn | A63F 13/79 |
| 2022/0198015 A1* | 6/2022 | Webster | G06F 21/57 |
| 2022/0247587 A1* | 8/2022 | Rolin | H04L 65/403 |
| 2022/0256433 A1* | 8/2022 | Dhawan | H04L 43/087 |
| 2022/0368658 A1* | 11/2022 | Soman | G06F 3/0481 |
| 2022/0377419 A1* | 11/2022 | Downing | G06F 3/14 |
| 2022/0408122 A1* | 12/2022 | Khanna | H04N 21/4316 |
| 2023/0074261 A1* | 3/2023 | Palamadai | H04L 65/4015 |
| 2023/0156023 A1* | 5/2023 | Albero | G06F 18/214 726/4 |
| 2023/0188509 A1* | 6/2023 | Artemov | H04L 63/06 713/168 |
| 2023/0353606 A1* | 11/2023 | DiPaulo | G06V 20/40 |

\* cited by examiner

DETECTING VIOLATIONS IN VIDEO CONFERENCING

TECHNICAL FIELD

The present disclosure generally relates to online meeting space environments.

BACKGROUND

Virtual meeting space environments and video conferencing are popular. Video conferencing typically involves a group of geographically remote participants joining an online meeting via respective user devices for collaboration and content sharing. During video conferencing, video streams of participants are displayed in windows in substantially real-time. Sometimes, despite best efforts, unwanted parties can invade a group chat or meeting and cause chaos. This is referred to as "virtual meeting bombing". Virtual meeting bombing results in distractions from the purpose of the chat/meeting and emotional distress for legitimate participants. This type of occurrences can increase as more inexperienced users start using virtual meeting spaces.

DETAILED DESCRIPTION

Overview

Figure 1:
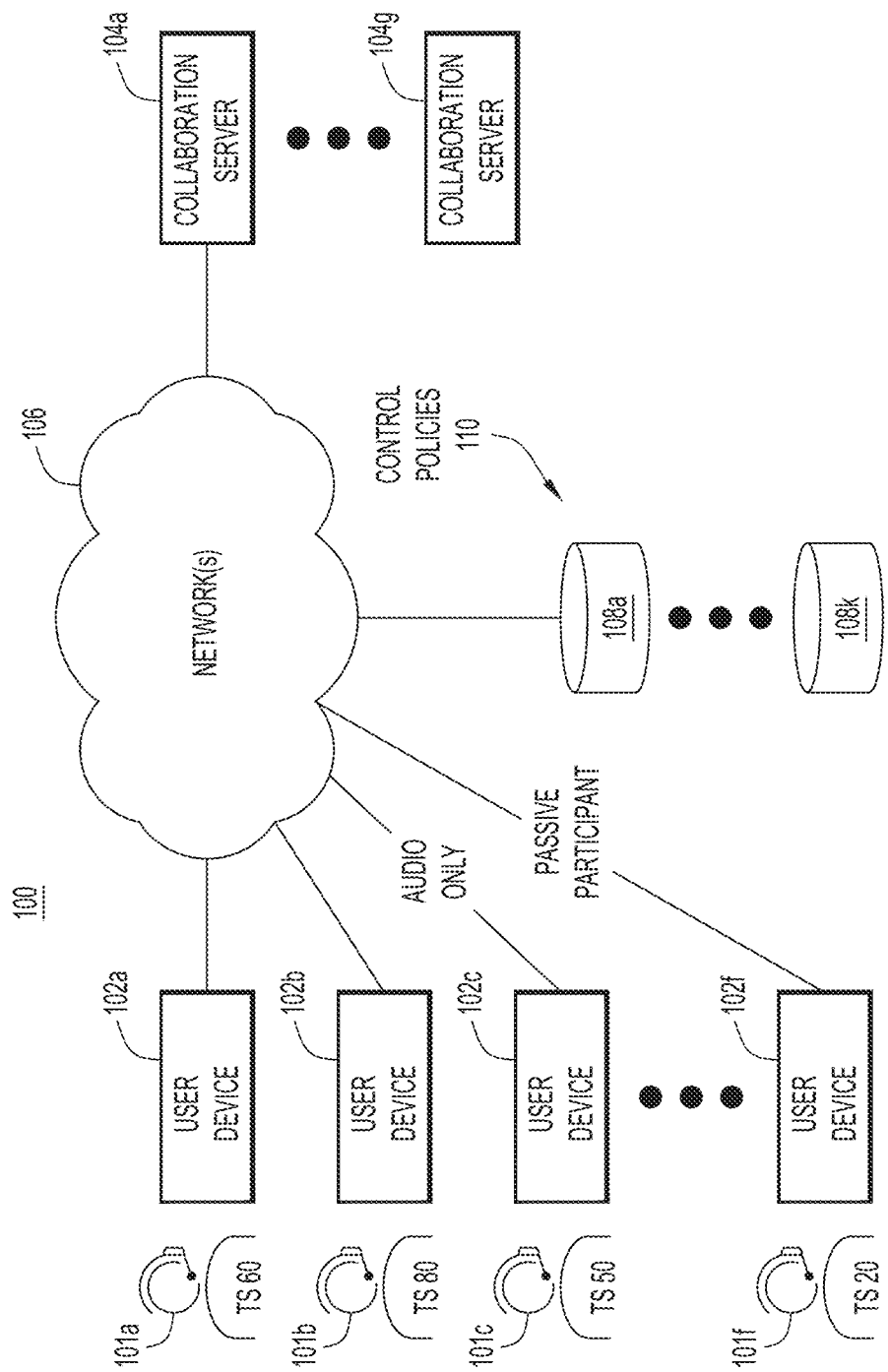
FIG. 1 is a block diagram illustrating a system configured to provide a collaboration session among a plurality of participants having various trust scores, according to one or more example embodiments.

Techniques presented herein provide security for collaboration sessions. The techniques protect collaboration sessions from occurrences of unwanted and/or inappropriate activities, events, or content.

In one form, a collaboration server connects at least two participants via respective user devices to a collaboration session. The collaboration server detects a violation occurring during the collaboration session. The violation indicates an inappropriate activity or content from a participant of the at least two participants. Based on detecting the violation, the collaboration server performs at least one mitigating action in connection with the collaboration session.

Example Embodiments

In an online meeting space environment, participants and/or users (these terms are used interchangeably throughout the description) are participating via their respective devices that may be geographically remote from each other. The participants and/or users include humans, bots, and/or other non-human entities such as automated computer systems.

The participant and the respective user (client) device, such as a computer, laptop, tablet, smart phone, etc., may collectively be referred to as endpoints or user devices. The user devices may communicate with each other via one or more networks such as the Internet, virtual private network (VPN), and so on.

The user devices typically have interactive connectivity in a collaboration session. Interactions may include, but are not limited to, manipulating a user interface screen to jump to a particular location, zooming, making changes to the actual items and/or objects being displayed such as adding, deleting, and/or editing items and/or objects on the user interface screen, and so on.

Collaboration session or an online video conference typically involves two or more participants being connected via their respective user devices in real-time for collaboration. During a collaboration session, the participants are displayed in their respective windows. The audio and/or video of the participants are provided in substantially real-time. Additionally, a canvas or a whiteboard may be provided during the collaboration session for content sharing and co-editing. To protect exchange of information during the collaboration session, privacy settings for a collaboration session may be used. Privacy setting may include requiring a password for a user to join a collaboration session, an invitation link, etc. While this provides some security for the collaboration session, virtual meeting bombing may still occur.

Techniques presented herein provide a mechanism for detecting an occurrence of an inappropriate activity or content during the collaboration session and performing at least one mitigation or mitigating action in connection with the collaboration session. Specifically, a violator may be excluded from a collaboration session or the level of participation of the violator may be limited e.g., participant cannot turn on the video/camera. Moreover, the collaboration session may be interrupted with participants being removed from the collaboration session and connected to a virtual lobby of a host of the collaboration session instead. Further, trust scores may be used to determine allowed level of participation for the participants during the collaboration session, as detailed below.

FIG. 1 is a block diagram illustrating a system 100 for providing a collaboration session among a plurality of participants having various trust scores, according to an example embodiment. The system 100 includes a plurality of participants 101*a-f*, a plurality of user devices (devices) 102*a-f*, a plurality of collaboration servers 104*a-g*, a network (or a collection of networks) 106, and one or more databases 108*a-k*.

The notations "a-n", "a-d", "a-f", "a-g", "a-k", "a-c", and the like denote that a number is not limited, can vary widely, depends on a particular use case scenario, and need not be the same, in number. Moreover, this is only examples of various collaboration sessions, and the number and types of sessions may vary based on a particular deployment and use case scenario.

In the system 100, one or more users/participants may be participating in a collaboration session (depicted as a first participant 101a, a second participant 101b, a third participant 101c, and a fourth participant 101f). Each participant has a respective trust score (TS). For example, the TS of the first participant 101a is 60, the TS of the second participant 101b is 80, the TS of the third participant 101c is 50, and the TS of the fourth participant 101f is 20. The trust scores may be generated by the collaboration services 104a-g based on activity, attributes, and behavioral history of the participant and/or respective user device. The participants 101a-fuse their respective devices 102a-f (depicted as a first endpoint device 102a, a second endpoint device 102b, a third endpoint device 102c, and a fourth endpoint device 102f) to participate in a collaboration session.

Level of their participation may be limited based on their trust score and/or activity or interactions in the collaboration session. For example, the first participant 101a and the second participant 101b have a full participation level because their TS is above 55. Full participation level may include providing their video (turning on their camera) and/or audio stream (unmuting their audio), sharing content, recording the collaboration session, editing content on a whiteboard, etc. On the other hand, the third participant 101c only has a partial participation level in which the camera must remain off (no video stream/cannot turn on your video) during the collaboration session because the TS score is 50. The fourth participant 101f also has a partial participation level. For example, the fourth participant 101f is a passive participant that can only observe the collaboration session (camera off, muted, cannot share content, cannot post messages in chat, etc.) because the TS score is below 30. In other words, the fourth participant 101f is cannot interact with, or participate in the collaboration session. This is but some non-limiting examples of participation levels. The participation levels may vary based on a particular use case scenario and security settings of the collaboration session.

As another non-limiting example, partial participation levels may include (a) not allowing the participant to provide the video stream, (b) not being able to share content (image or textual), (c) not being able to edit content (image or textual) shared during the collaboration session, (d) not being able to record the collaboration session, (e) not being able to view content being shared, (f) not being able to view video streams of other participants, (g) not being able to post comments, questions, etc., (h) participating on mute, (j) any combination thereof, etc. The participation levels may be specified in one or more of the control policies 110 stored in the databases 108a-k. These control policies 110 are implemented by the collaboration servers 104a-g.

The collaboration servers 104a-g (depicted as a first collaboration server 104a and a second collaboration server 104g) manage and control collaboration sessions. The collaboration servers 104a-g and the devices 102a-f communicate with each other via the network(s) 106.

The one or more networks 106 may include a local area network (LAN), a wide area network (WAN) such as the Internet, or a combination thereof, and includes wired, wireless, or fiber optic connections. In general, the one or more networks 106 can use any combination of connections and protocols that support communications between the entities of the system 100.

In one or more example embodiments, the collaboration servers 104a-g monitor activities occurring in collaboration sessions and detect violations of the control policies 110. Further, the collaboration servers 104a-g may obtain and/or adjust trust scores assigned to the participants 101a-f and/or limit their participation in a collaboration session based on the respective trust score. Additionally, the collaboration servers 104a-g may perform various mitigating actions when a violation in the collaboration session is detected. The mitigating action may include but are not limited to (a) limiting participation level of the violator(s) (camera turned off), (b) excluding the violator(s) from the collaboration session, (c) limiting violator(s)' access to data and/or media stream of the collaboration session, (d) interrupting the collaboration session and connecting the participants to a virtual lobby of the host, and/or (e) continuing the collaboration session but removing the violator(s) from the collaboration session and connecting the violator(s) to the virtual lobby of the host.

The collaboration servers 104a-g retrieve the control policies 110 for the collaboration sessions from the databases 108a-k and execute these control policies 110 for the collaboration sessions. The control policies 110 may be user-defined and/or user-specific based on the participant that initiated the collaboration session (called the host). The control policies 110 may be granular such as platform specific, enterprise specific, and/or user specific. Moreover, the control policies 110 may vary depending on a type of collaboration session. That is, a user may have different types of control policies 110 set up for internal collaboration session (within the enterprise) and external collaboration session (with external entities such as clients).

Control policies 110 define participation level for various trust scores. Control policies 110 further define rules for assigning and adjusting the trust scores of the participants 101a-f. Control policies 110 further define violations such as but not limited to prohibited utterances and/or messages (slurs, hate speech, inappropriate utterances, etc.), inappropriate content (questionable logos, signs, inappropriate images, text, etc.) in content being shared, physical and/or virtual backgrounds, etc., inappropriate gestures (showing the finger, grimaces, etc.).

The devices 102a-f communicate with the collaboration servers 104a-g to join and participate in the collaboration session. The collaboration servers 104a-g retrieve and control distribution of various content from the databases 108a-k and media stream of the collaboration session to the devices 102a-f based on the participant trust scores and the participation levels specified in the control policies 110.

The collaboration servers 104a-g further store identifiers of various collaboration sessions that may be obtained from the databases 108a-k (one or more memories), depicted as a first database 108a and a second database 108k. The collaboration servers 104a-g are configured to communicate with various client applications executing on the devices 102a-f. The client applications running on the devices 102a-f detect various actions performed by the respective participants during a collaboration session and notify the respective collaboration server associated with the collaboration session about these events. The respective collaboration server may render or display, in a collaboration space and/or on a user interface screen of the respective device, one or more contents of the collaboration session. That is, one of the collaboration servers 104a-g sends commands to the client applications running on the devices 102a-f to render content in a particular way, to change views, controls, and so on. The collaboration servers 104a-g control the collaboration sessions by communicating and/or interacting with client applications running on the devices 102a-f that detect various actions performed by the participants during the collaboration sessions and execute commands and/or instructions for the collaboration sessions as provided by the collaboration servers 104*a-g*.

In one example embodiment, the collaboration servers 104*a-g* detect violations based on the control policies 110 and data provided by the client applications executing on the devices 102*a-f*. The data includes a video stream, an audio stream, interactions performed, metadata (text, images), etc. In yet another example embodiment, the control policies 110 may be distributed, by the collaboration servers 104*a-g*, to the client applications running on the user devices 102*a-f*. The client applications may then detect a violation and inform the collaboration servers 104*a-g*. When a violation is detected, the collaboration servers 104*a-g* are triggered to perform one or more mitigating actions. Mitigating actions may also be defined in the control policies 110 and may vary depending on the trigger (detected violation) and/or user preferences. For example, the mitigating actions may include identifying the participant that triggered the violation and excluding this participant for the collaboration session.

Figure 2:
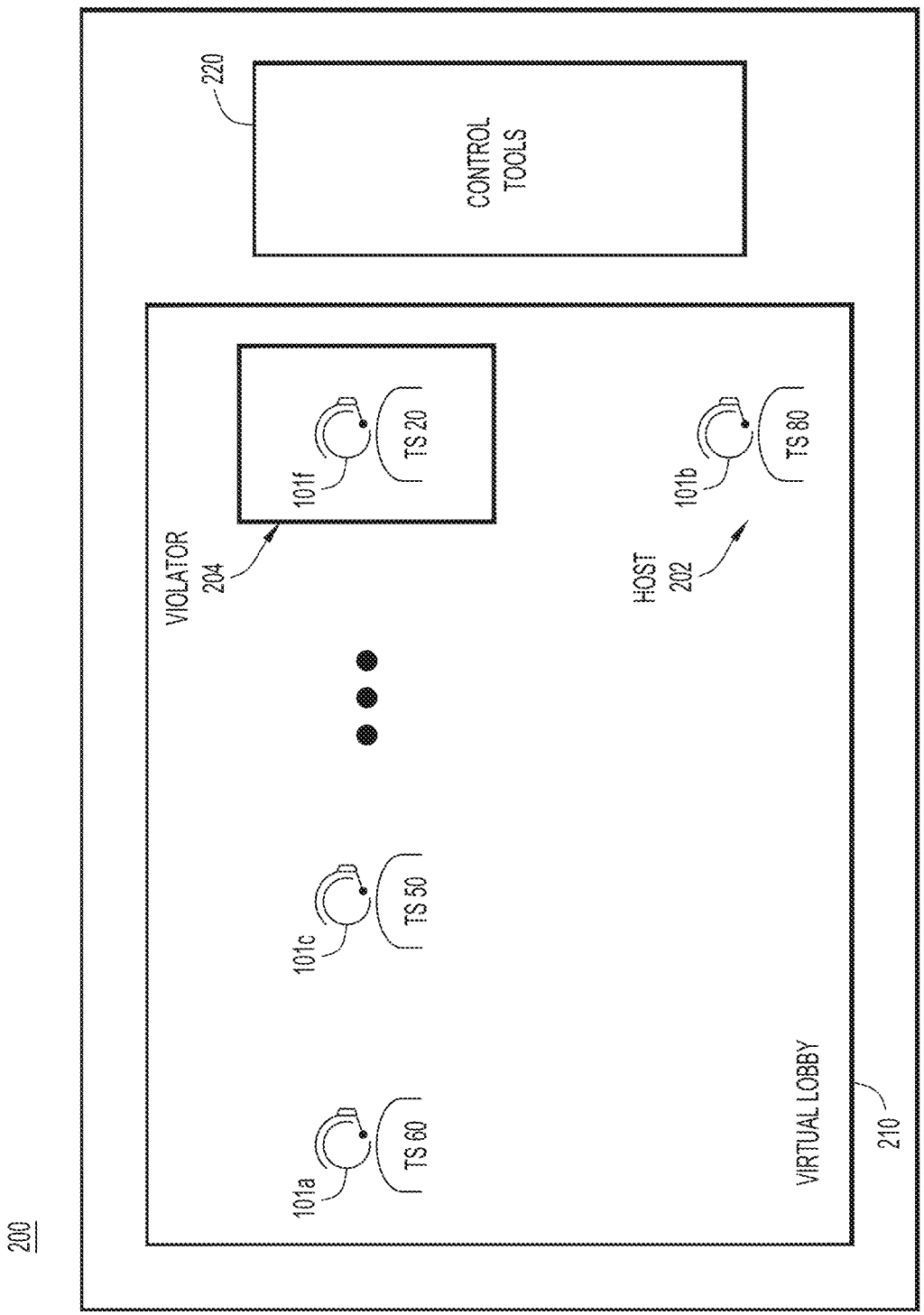
FIG. 2 is a view illustrating a user interface of a host of a collaboration session in which a violation is detected, according to an example embodiment.

With continued reference to FIG. 1, FIG. 2 is a view illustrating a user interface 200 of a host of a collaboration session in which a violation is detected, according to an example embodiment. The user interface 200 belongs to a host 202 of the collaboration session and includes a virtual lobby 210 and control tools 220.

The user interface 200 is one example of a mitigating action performed by one of the collaboration servers 104*a-g* (e.g., the first collaboration server 104*a* that controls the collaboration session initiated by the host 202). The mitigating action includes the first collaboration server 104*a* interrupting the collaboration session. Specifically, the participants 101*a-f* are removed from the collaboration session i.e., the devices 102*a-f* are disconnected from an ongoing, active collaboration session, and instead the devices 102*a-f* are connected to the virtual lobby 210 of the host 202. Based on the foregoing, the user interface 200 of the second participant 101*b* (the host 202) is switched from the active collaboration session to the virtual lobby 210 and the control tools 220.

The virtual lobby 210 shows the host 202 and other participants (the first participant 101*a*, the third participant 101*c*, and the fourth participant 101*f*) and their respective TS scores. Additionally, the fourth participant 101*f* is flagged, depicted with a box, as a violator 204. The violator 204 is identified as the participant that violated the control policies 110 and triggered the mitigating action. The box is an example of flagging the violator 204. Other visual representations for flagging or identifying the violator 204 are within the scope of the disclosure and may include but are not limited to visual representations (highlight, emphasis, shadings, symbols, etc.), audio notifications, and/or special effects (flashing representation of the violator 204, etc.).

Using the control tools 220, the host 202 may perform one or more mitigating actions in connection with the collaboration session. The host 202 provides various inputs using the control tools 220. For example, the host 202 manipulates the control tools 220 to limit the level of participation for the violator 204, adjusts control settings for the collaboration session (e.g., no participants that have a TS below 40), and resumes the collaboration session that is restricted by the performed mitigating actions. The user interface 200 is one example of various mitigating actions that are performed when a violation is detected.

In yet another example embodiment, the mitigating actions may include the first collaboration server 104*a* interrupting the collaboration session for the violator(s) only e.g., the fourth participant 101*f* (or the violator 204) while continuing the collaboration session for other participants (the first participant 101*a*, the third participant 101*c*, and the host 202). The violator(s) (the fourth participant 101*f*) is removed from the collaboration session by disconnecting the fourth endpoint device 102*f* from the collaboration session and instead connecting the fourth endpoint device 102*f* to the virtual lobby 210 of the host 202. Based on the foregoing, the user interface 200 of the host 202 depicts the fourth participant 101*f* with the respective trust score.

The host 202 may manipulate the control tools 220 to remove the fourth participant 101*f* from the virtual lobby 210 (terminate the connection of the fourth participant 101*f* to the virtual lobby 210). Thus, the fourth participant 101*f* is excluded from the collaboration session (connection terminated).

Alternatively, the host 202 may further manipulate the control tools 220 to return the fourth participant 101*f* to the collaboration session but with a limited level of participation and/or a limited access to data of the collaboration session. For example, the fourth participant 101*f* may be returned to the collaboration session with camera off, on mute, without the ability to share content, and/or post messages, etc. The fourth participant 101*f* may be returned to the collaboration session but without receiving the video stream of the collaboration session, without receiving the audio stream of the collaboration session, without being able to access or view content being shared in the collaboration session, and/or without being able to view posts, texts, chats, questions and answers, etc. In other words, the data (multimedia stream and/or metadata) of the collaboration session provided to the fourth participant 101*f* is limited/restricted.

By actively detecting unusual and/or inappropriate activity occurring during a collaboration session (violations), users are protected from unwanted behaviors. The users are protected by being automatically sent to a virtual lobby as a mitigating action. The trust score for each user aids the host 202 in next steps to take to resume the collaboration session. The user are protected by having the violator(s) automatically removed from the collaboration session and sent to the virtual lobby while the collaboration session is continuing for other participants of the collaboration session, as another mitigating action.

Figure 3:
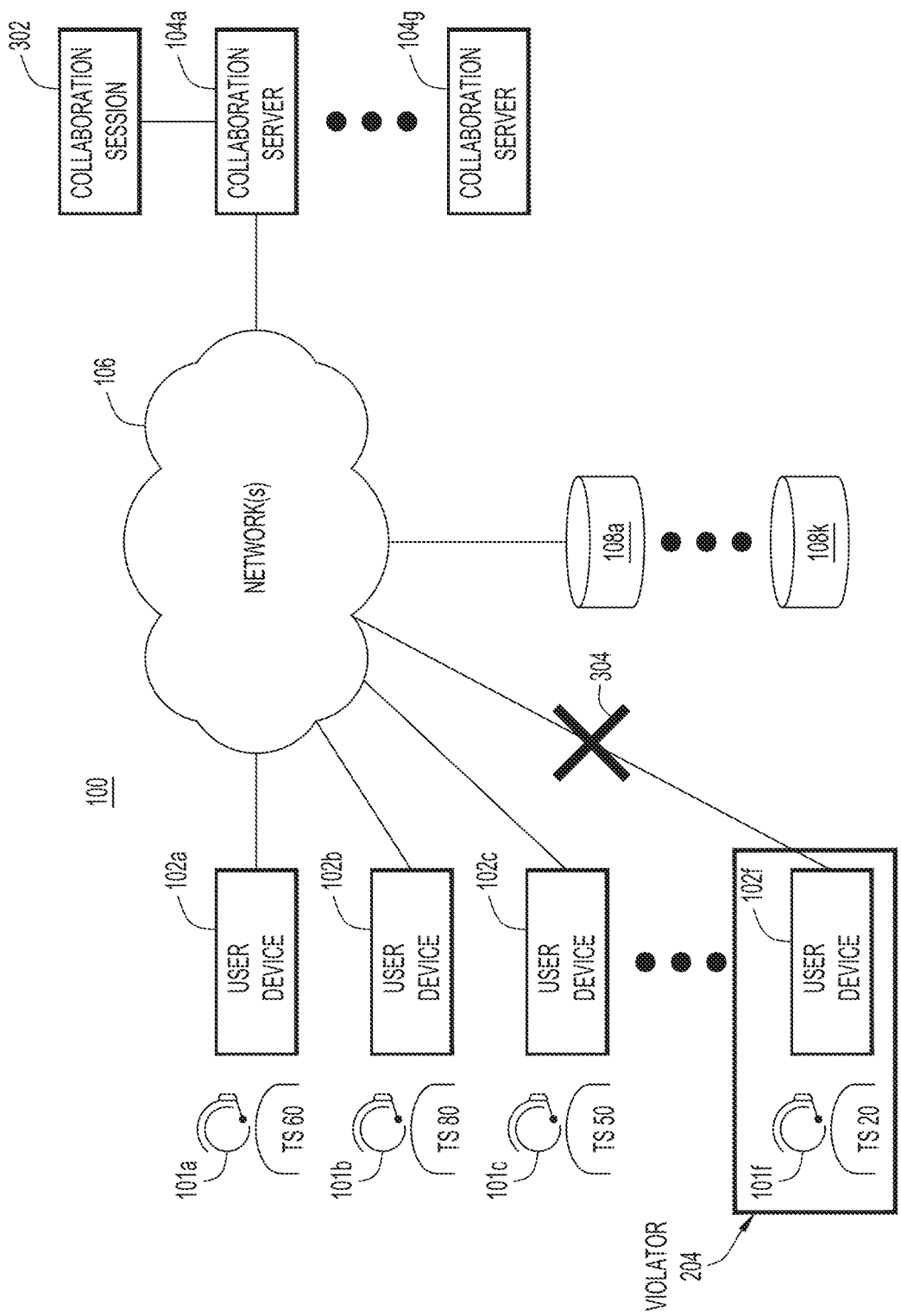
FIG. 3 is a block diagram illustrating the system in which the collaboration session is resumed but is restricted by at least one mitigating action, according to an example embodiment.

With continued reference to FIGS. 1 and 2, FIG. 3 is a block diagram illustrating the system 100 in which a collaboration session is resumed but is restricted by at least one mitigating action, according to an example embodiment.

Specifically, a collaboration session 302 includes the first participant 101*a*, the second participant 101*b* (the host 202), and the third participant 101*c*. Communication to and from the fourth participant 101*f* (the violator 204) is excluded from the collaboration session 302, depicted with an "X" at 304. In other words, the first collaboration server 104*a*, restricts all communication with the violator 204 during the collaboration session 302.

In one example embodiment, excluding the violator is based on the mitigating actions described with reference to FIG. 2 (e.g., the host 202 provides input to exclude the violator 204). In another example embodiment, the first collaboration server 104*a* detects an occurrence of the violation and perform the mitigating action of excluding the violator 204 (without providing the user interface 200 of FIG. 2).

After the collaboration session 302 is terminated, the collaboration servers 104a-g may further adjust the TS scores of the participants 101a-f. For example, the TS score of the fourth participant 101f (the violator 204) may be decreased by a predetermined number of points as specified in the control policies 110 e.g., the TS score of the fourth participant 101f may be set to 10.

In other example embodiments, depending on the trust score of the violator(s), different mitigating actions may occur such that the violator(s) are connected to the collaboration session but with limited participation level and restricted access to data and/or metadata of the collaboration session (limiting one or more of: a video stream of the collaboration session, an audio of the collaboration session, content of the collaboration session, and other metadata such as chats, posts, transcripts, etc. of the collaboration session).

Figure 4:
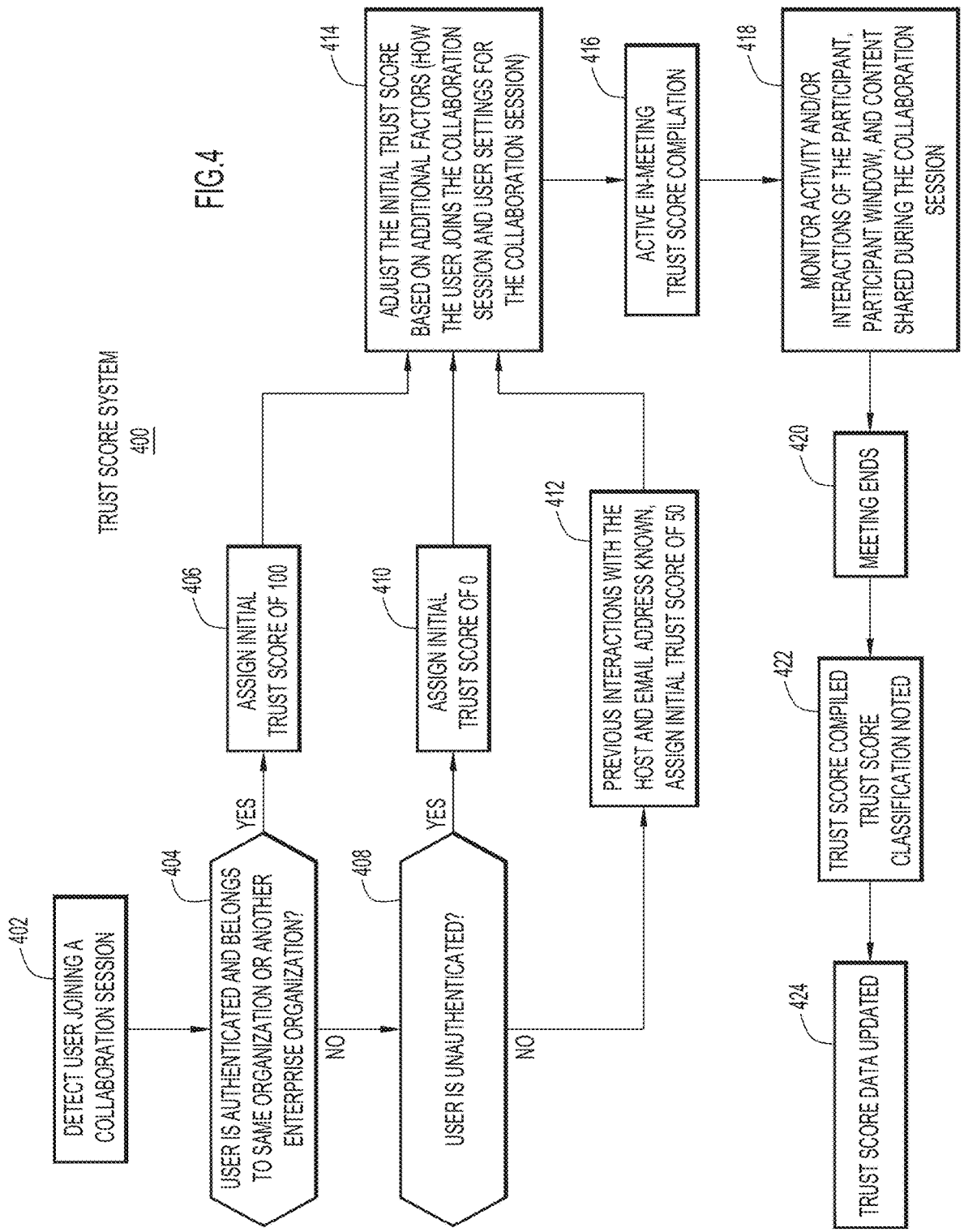
FIG. 4 is a flow diagram illustrating a trust score system managing trust scores assigned to participants of a collaboration session, according to an example embodiment.

With continued reference to FIG. 1, FIG. 4 is a flow diagram illustrating a trust score system 400 managing trust scores assigned to participants of a collaboration session, according to an example embodiment. The trust score system 400 may be implemented by one or more of the collaboration servers 104a-g.

The trust score system 400 is configured to assign a trust score to each of the participants 101a-f. The trust score may be stored in one of the databases 108a-k. The trust score may continuously be updated based on user's participation on social media platforms (various collaboration services). For example, the trust score may be stored in a user profile and shared by various social media platforms and/or collaboration services of different service providers and updated based on user activities in these various platforms and/or collaboration services. In one example, the trust score of the user is a global trust score that is provided along with other information from the user profile to each activated platform and/or collaboration service. The global trust score reflects user's history of participation in previous collaboration sessions in various social platforms.

The trust score system 400 performs user and entity behavior analysis (UEBA) and tracks and documents normal behaviors of users, assign the trust score, and allows fast remediation when bad participants join a collaboration session. The trust score system 400 assigns the trust score based on historical behaviors of the respective participant. The trust score may be classified or grouped into one of score categories such as trusted group, untrusted group, and no data group. Attendees of a collaboration session each have a trust score even if the attendee is a new user. The trust score is assigned and adjusted based on a plurality of adjustable factors.

Specifically, at 402, the trust score system 400 detects that a user joined a collaboration session based on one of the collaboration servers 104a-g connecting an endpoint device of the user to a collaboration session.

The trust score system 400 assigns a trust score to the user based, in part, on the credentials of the user. In particular, at 404, the trust score system 400 determines whether the user is an authenticated user (e.g., the user is logged in using a username and a password) and whether the user belongs to the same organization or another enterprise organization. If yes, the user is assigned an initial trust score of TS100, at 406.

On the other hand, if at 404, the trust score system determines that the user is not authenticated, at 408, the system may check if the unauthenticated user used an email address when joining the collaboration session at 402 and/or whether the user previously interacted with the host. Based on the foregoing, the trust score system 400 may assign an initial trust score (in a range of 0-50). A new unauthenticated user that never corresponded with the host and did not provide an email address at joining is assigned a trust score of 0, at 410. On the other hand, the user that provided an email address and had previous interactions with the host may be assigned an initial trust score of 50, at 412. In one or more example embodiments, the initial trust score is based on various adjustable factors such as: (a) whether the participant is authenticated, (b) whether the participant is in the same organization as the host of the collaboration session, (c) whether the participant has recently interacted with the host (emails, group chats, other collaboration sessions, phone calls, etc.), (d) whether the participant provided contact information when joining the collaboration session (email, phone number, etc.). This information may be obtained using various insight tools such as people insights and/or personal insights.

The initial assigned trust score may further be adjusted by considering additional factors, as detailed below. Values of the trust scores assigned and the numbers used to increase and/or decrease the trust scores are provided by way of an example only and actual values vary based on a particular implementation of the trust score system 400 and use case scenarios.

At 414, the trust score system 400 considers additional factors related to the user and/or endpoint device and adjusts the initially assigned trust score at 406, 410, or 412. These additional factors may include but are not limited to one or more of:

(a) data related to the user device joining the collaboration session. For example, the user device connects to a collaboration session via a downloaded client application, the trust score may be increased by 20. If the user joins the collaboration session through a thin client application, the trust score may be increased by 10 and if the user joins the collaboration session via a web application, the trust score may be decreased by 20. In other words, data related to how the user joins the collaboration session is analyzed to adjust the initial trust score.

(b) attributes of the user device. For example, if the user device is joining with a familiar internet protocol (IP) address, a familiar device, etc., the trust score may be increased by 20. If the user is connecting to a collaboration session from a public computer in a public place, the trust score may be decreased by 20. If the user is using a new personal endpoint device, the trust score may also be decreased by 10.

(c) geographic location of the user device. For example, if the collaboration session relates to a neighborhood association meeting, joining a collaboration session from a user device that is local to the host location, increases the trust score by 20. On the other hand, joining the collaboration session from a geographically remote location, decreases the trust score by 10 and joining from a different suspect country may decrease the trust score by 20.

(d) data related to settings of the user for the collaboration session. That is, features set for use in the collaboration session may increase or decrease the trust score. For example, if the user joins with camera on (video on), the trust score is increased and if the camera is off, the trust score is decreased. As another example, if the user joins with audio on, the trust score is increased and if the user joins on mute, the trust score is decreased. As yet another example, if the user joins with a physical background, the trust score is increased and if the user blurs the background or uses a virtual background, the trust score is decreased.

By adjusting the initial trust score based on additional factors at 414, an active in-meeting trust score compilation is generated at 416. The active in-meeting trust score compilation may be used to determine the level of participation for the user in the collaboration session, as explained in FIG. 1. The control policies 110 of FIG. 1 may specify level of participation for various trust score ranges. For example, the trust scores may be grouped into classifications such as trusted user (trust score 80-100), untrusted user (trust score of 30-80), or no data (score of 0). The control policies 110 may specify that (a) for trusted user allow access with full participation level, (b) for the untrusted user allow access with limited or partial participation level, and (c) for no data user allow access only as a passive participant (observe only).

The trust score system 400 further tracks and monitors activity and interactions during the collaboration session and updates the trust score after the termination of the collaboration session.

Specifically, at 418, the trust score system 400 monitors audio and video stream of the participant during the collaboration session, content shared, and/or attributes of the participant window (space) to adjust the trust score after the collaboration session terminates.

That is, during an ongoing active collaboration session, the participants are displayed in their respective windows. A window is a space or environment of a respective participant. A window includes a foreground (space in front of the participant) and a background (space behind the participant). For example, the window may include a part of a participant's desk and office background (e.g., wall, painting, a bookcase, etc.). A window may be a physical space (real environment of a participant) or a virtual space. For privacy and/or other reasons, participants may blur all or portion(s) of their real physical environment or replace it with an image (virtual background). For example, a participant may be displayed at a beach, on a mountain, in an imaginary office setting with other participants therein, etc. The trust score system 400 increases the trust score for the physical background and decreases the trust score when a virtual or blurred background is used. Further, depicting inappropriate logos, images, and/or text in the window, may decrease the trust score. In short, the trust score system 400 tracks attributes of the participant window including the background type to adjust the trust score.

The trust score system 400 further analyzes user interactions and/or activity during the active collaboration session to adjust the trust score. The interactions may include but are not limited to how often the participant speaks during the collaboration session, how often the participant shares content during the collaboration session, how often the participants posts to chat and/or question and answer section during the collaboration session, how often the participant has the camera on (provides video stream), how often the participant raises hands, whether a physical background is used (background type used in the window of the respective participant), whether the user engages in a bad behavior (described below), etc.

At 420, one of the collaboration servers 104a-g terminates the collaboration session.

At 422, the trust score is adjusted/compiled based on data tracked at 418. As noted above, potentially bad behavior during the collaboration session is monitored and the score is adjusted accordingly. For example, speech and text tracking results in detecting hate speech, slurs, inappropriate utterances via voice and/or chat/messaging; image detection tracking results in tagging questionable logos, signs, text, gestures, and/or content. Additionally, if the trust score system 400 determines that the attendee is non-human (bot or an automated computer system), the trust score may be substantially decreased. In other words, the data collected from various collaboration sessions attended by the participant, contributes to the participant's trust score over time.

The adjusted trust score is classified (assigned to a particular group) and at 424, the trust score is updated in one of the databased 108a-k.

Figure 5:
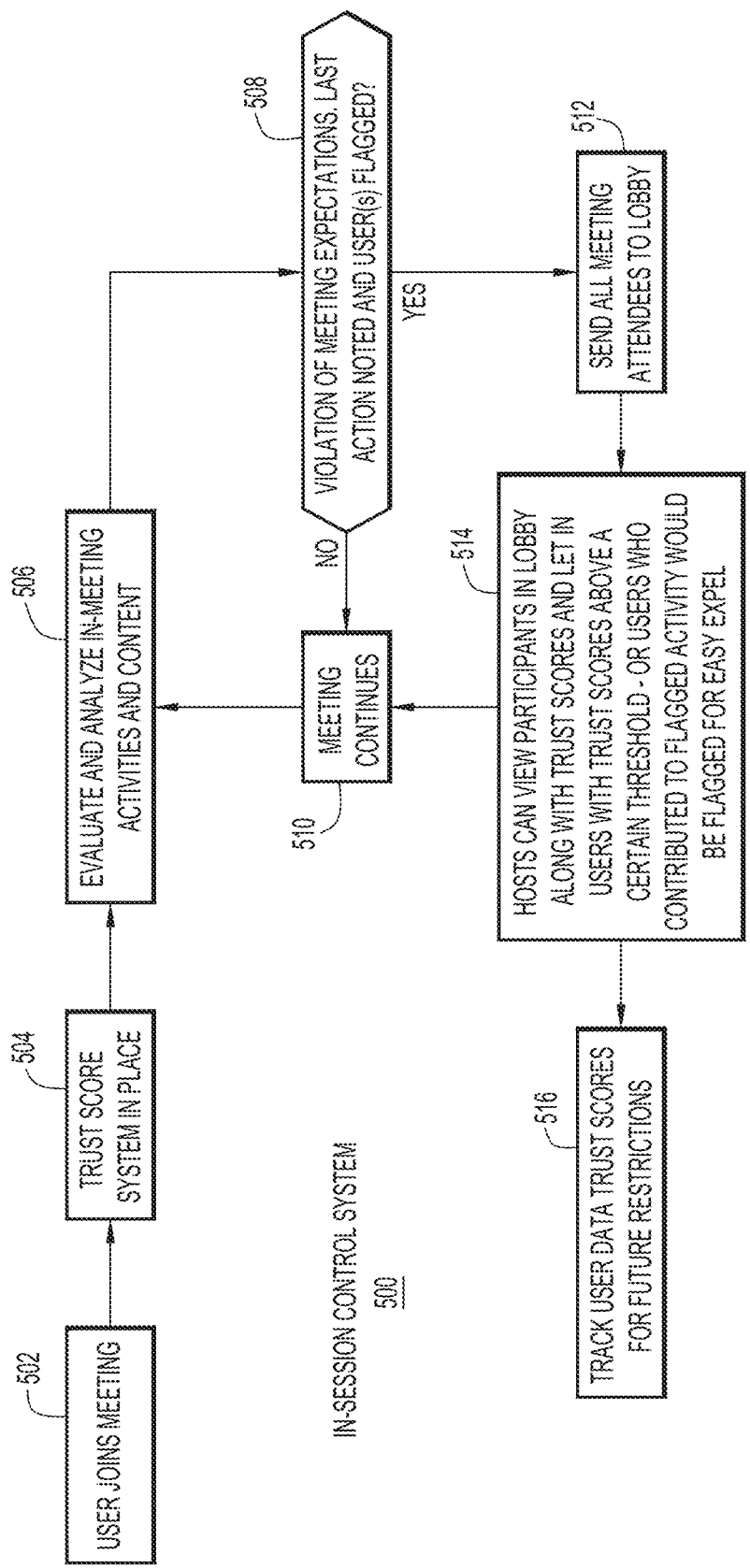
FIG. 5 is a flow diagram illustrating a control system detecting violations during a collaboration session and performing one or more mitigating actions in connection with the collaboration session, according to an example embodiment.

With continued reference to FIG. 1, FIG. 5 is a flow diagram illustrating an in-session control system 500 detecting a violation during a collaboration session and performing at least one mitigating action in connection with the collaboration session, according to an example embodiment. The in-session control system 500 may be implemented by one or more of the collaboration servers 104a-g.

The in-session control system 500 is configured to monitor an ongoing collaboration session and detect violations of the control policies 110. In other words, the in-session control system 500 monitors content presented during the collaboration session, participation by the participants 101a-f during the collaboration session (activities, interactions, gestures, signs, attributes of the window such as text and logos therein, background type, etc.) and detects violations. Based on detecting a violation, the in-session control system 500 performs one or more mitigating actions in connection with the collaboration session.

Specifically, at 502, the in-session control system 500 detects that a user joined a collaboration session based on one of the collaboration servers 104a-g connecting an endpoint device of the user to a collaboration session.

At 504, the in-session control system 500 obtains the trust score of each participant from the trust score system 400 of FIG. 4. The level of participation allowed for the participant in the collaboration session may vary based on the trust score, as explained above.

At 506, the in-session control system 500 evaluates and analyzes in-meeting activities and content. Specifically, the in-session control system 500 continuously monitors activities, interactions, and content occurring in the active collaboration session to detect violations. The in-session control system 500 performs image recognition to flag inappropriate images and/or texts, speech recognition to flag inappropriate language, analyzes shared contextual information (content) e.g., when a participant with a low trust score takes over and shares content, and analyzes logos, texts, signs, etc. in the window of the participant.

In other words, the in-session control system 500 monitors audio from the participants 101a-f to detect an inappropriate utterance, tracks content presented in the collaboration session to detect an inappropriate logo and/or text. The in-session control system 500 monitors respective windows of the participants 101a-f included in their video streams to detect inappropriate gestures, signs, images, and/or objects in the physical background, for example. The in-session control system 500 considers attributes of a participant window (signs, logos, text, etc.) to detect violations. The in-session control system 500 detects a violation when an occurrence of an activity or data during the collaboration session satisfies or meets at least one of the control policies 110.

At 508, the in-session control system 500 determines whether a violation of meeting expectations occurred. If the violation is not detected, at 510, the meeting continues and the in-session control system 500 continues to evaluate and analyze the in-meeting activities and content of an ongoing collaboration session at 506.

If the violation has occurred, the last action that triggered the violation and the violator(s) (such as the violator 204 of FIG. 2) are flagged. At 512, the in-session control system 500 performs at least one mitigating actions. For example, the in-session control system 500 interrupts the collaboration session by removing each of the participants 101a-f from the collaboration session and connecting them to a virtual lobby of the host (such as the virtual lobby 210 of FIG. 2). In short, all meeting attendees are sent to the virtual lobby so that further damage or violations do not occur. As another example, the in-session control system 500 removes the violator(s) from the collaboration session while continuing the collaboration session for other participants (innocent participants).

At 514, the in-session control system 500 provides the host with the user interface 200 of FIG. 2. That is, the host views the participants 101a-f in the virtual lobby 210 with their respective trust scores. The host manipulates the control tools 220 of FIG. 2 to allow a user with a trust score above a certain threshold into the collaboration session and/or to limit the participation level of participants that have a trust score below a first predetermined threshold, and/or to restrict access to multimedia data and metadata of the collaboration session for the participants with the trust score below a second predetermined threshold. In the virtual lobby 210 of FIG. 2, the violator(s) that contributed to the flagged activity (triggered the violation) are flagged for easy exclusion from the collaboration session or to make it easier for the host to allow them back into the collaboration session with limited level of participation (e.g., passive participant that can only observe the collaboration session) and/or restricted access to multimedia stream and metadata of the collaboration session (exclude access to the video stream of the collaboration session, to the audio of the collaboration session, and/or content of the collaboration session, etc.). The host may expel or limit participation of the violator(s) and/or limit their access to data of the collaboration session, individually or as a group e.g., exclude all untrusted users and no data users from the collaboration session.

While in one or more example embodiments, the host performs the mitigating actions, the disclosure is not limited thereto. In other example embodiments, the in-session control system 500 may perform one or more mitigating actions such as excluding the violator(s) or limiting their participation level(s) e.g., to a passive participant that can only observe the collaboration session. The in-session control system 500 may remove the violator(s) from the collaboration session and connect the violator(s) to the virtual lobby while continuing the collaboration session for other participants. The in-session control system 500 may restrict access to the video stream, audio, content, and/or other metadata of the collaboration session, to the violator(s).

In yet other example embodiments, multiple hosts, co-hosts, panelists, moderators, etc. may perform the mitigating actions to resolve the issue. In one example, instead of the in-session control system 500, a host may trigger connecting the participants 101a-f to the virtual lobby during the collaboration session and instruct the in-session control system 500 to exclude or limit participation level or adjust required trust scores for various participation levels, etc.

When the mitigating actions are completed, the in-session control system 500 resumes or continues the collaboration session, at 510. The resumed collaboration session is restricted by the at least one mitigating action, e.g., the collaboration session 302 of FIG. 3.

At 516, the in-session control system tracks user data trust scores for future restrictions. Specifically, information about the flagged attendees and violations is logged and tracked for further investigation by the trust score system 400 of FIG. 4. The trust score system 400 updates the trust scores after the collaboration session terminates (post-meeting).

The techniques explained above facilitate detecting occurrences of an unusual/inappropriate activity and content from one or more of the participants during the collaboration session. Based on detecting this occurrence, the techniques perform one or more mitigating actions such as discontinuing/interrupting the collaboration session (e.g., sending all meeting participants to a virtual lobby and flagging the participant(s) that triggered this activity) so that a host or the in-session control system 500 of the collaboration session can take additional mitigating action(s), restrict the collaboration session by limiting participation level of the violator(s) or excluding the violator(s) from the collaboration session, removing only the violator(s) from the collaboration session while continuing the collaboration session for other participants, limiting access of the violator(s) to the multimedia stream and/or metadata of the collaboration session, etc.

In one or more example embodiments, the in-session control system 500 may take different mitigating actions depending on severity of the violation. For example, some inappropriate activities (e.g., hate speech, inappropriate utterances, etc.) triggers exclusion of the violator(s) from the collaboration session. In one example, the violator may be excluded and banned from rejoining the collaboration session by the in-session control system 500. While example embodiments above, described the mitigating actions as moving all the participants to the lobby, in one example embodiment, only one or more violators are removed from the ongoing collaboration session and connected to a virtual lobby of the host. While other inappropriate activities (e.g., questionable logo) triggers limiting the participation level of the violator(s) such as camera off during the collaboration session. Additionally, the mitigating actions may include deleting content attributable to the violator/offender from the recording of the collaboration meeting. One or more mitigating actions may be specified in the control policies 110 of FIG. 1.

Figure 6:
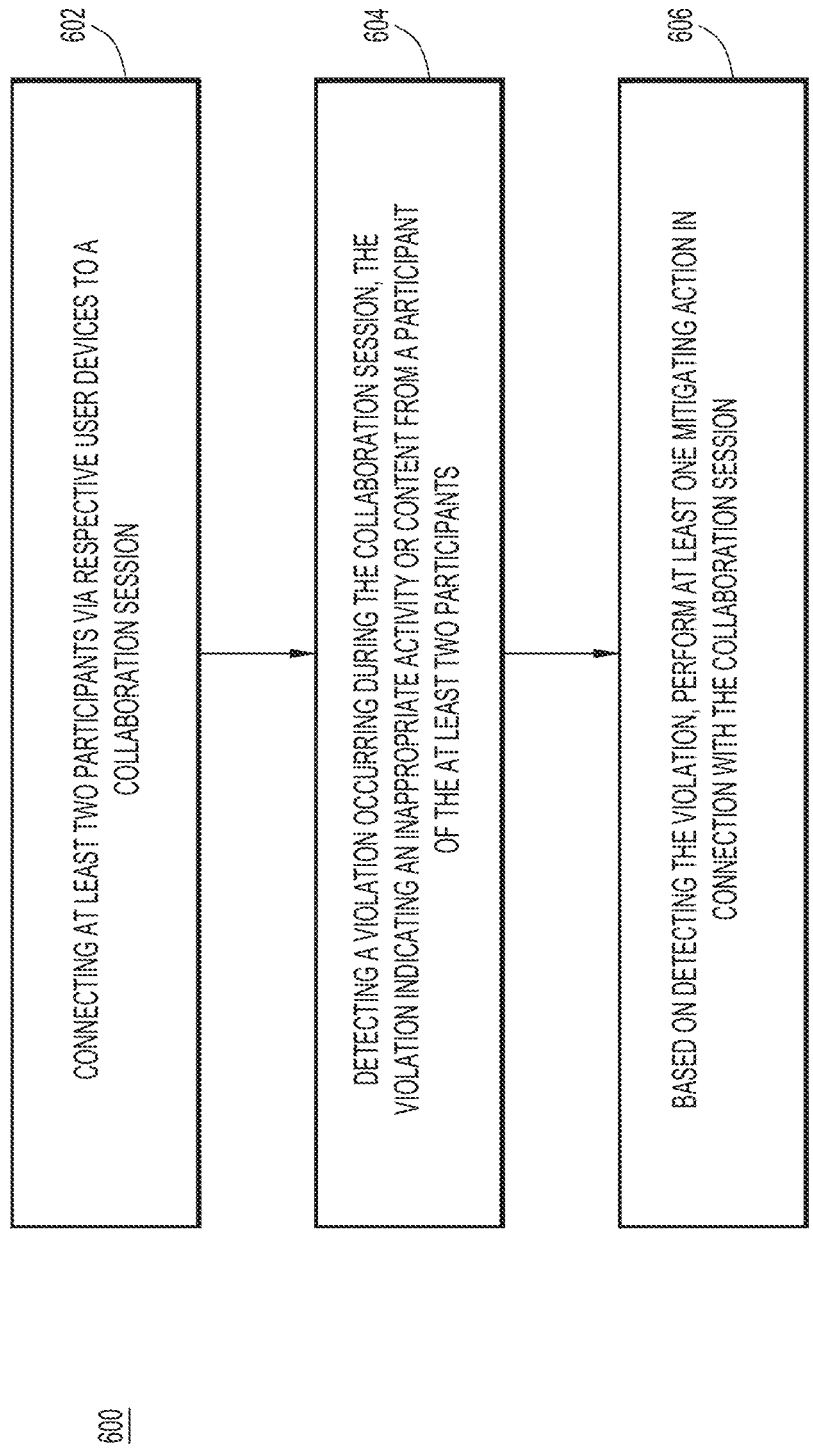
FIG. 6 is a flow diagram illustrating a method of performing at least one mitigating action in connection with a collaboration session when a violation in the collaboration session is detected, according to an example embodiment.

FIG. 6 is a flow diagram illustrating a method 600 of performing at least one mitigating action in connection with a collaboration session when a violation in the collaboration session is detected, according to an example embodiment. The method 600 may be performed by one or more collaboration servers such as the collaboration servers 104a-g of FIG. 1 and/or an in-session control system such as the in-session control system 500 of FIG. 5.

The method 600 involves, at 602, a collaboration server connecting at least two participants via respective user devices to a collaboration session.

The method 600 further involves at 604, the collaboration server detecting a violation occurring during the collaboration session. The violation indicates an inappropriate activity or content from a participant of the at least two participants.

Additionally, the method 600 involves at 606, based on detecting the violation, the collaboration server performing at least one mitigating action in connection with the collaboration session.

In one form, the operation 606 of performing the at least one mitigating action may include excluding, by the collaboration server, the participant from the collaboration session or limiting a participation of the participant in the collaboration session. The participation includes one or more of a video stream of the participant, an audio of the participant, sharing content by the participant, and a chat message from the participant.

In yet another form, the operation 606 of performing the at least one mitigating action may include interrupting the collaboration session by removing the at least two participants from the collaboration session and connecting the at least two participants to a virtual lobby of a host of the collaboration session.

In one instance, the operation 606 of performing the at least one mitigating action may further include identifying the participant from the at least two participants that triggered the violation, flagging the participant that triggered the violation in the virtual lobby, obtaining, from the host, input indicating whether to limit participation of the participant in the collaboration session or to exclude the participant from the collaboration session, and resuming the collaboration session for the at least two participants. The collaboration session may be restricted by the at least one mitigating action.

In yet another form, the operation 606 of performing the at least one mitigating action may include excluding the participant from the collaboration session or limiting access of the participant to one or more of: a video stream of the collaboration session, an audio of the collaboration session, content of the collaboration session, and metadata of the collaboration session.

In yet another form, the operation 606 of performing the at least one mitigating action may include removing the participant from the collaboration session while continuing the collaboration session for other participants of the collaboration session and connecting the participant to a virtual lobby of a host of the collaboration session.

According to one or more example embodiments, the operation 604 of detecting the violation may include one or more of: monitoring audio during the collaboration session to detect an inappropriate utterance from the participant of the at least two participants, tracking content presented in the collaboration session by the at least two participants to detect an inappropriate logo or text, and monitoring the at least two participants and respective participant windows to detect an inappropriate gesture, sign, or image.

In one instance, the method 600 may further include defining at least one control policy for the collaboration session. The at least one control policy specifies one or more of: a plurality of participant activities, a plurality of images, textual content, and data not allowed during the collaboration session. The operation 604 of detecting the violation may include detecting an occurrence of an activity or data during the collaboration session that satisfies the at least one control policy.

In another instance, the method 600 may further include terminating, by the collaboration server, the collaboration session and adjusting a trust score assigned to each of the at least two participants based on one or more activities of a respective participant during the collaboration session.

In yet another instance, the method 600 may further include obtaining a trust score for each of the at least two participants. The trust score is generated based on one or more of: an authentication level of a respective participant of the at least two participants, geographic location and a type of a user device of the respective participant, and history of participation in previous collaboration sessions by the respective participant.

According to one or more example embodiments, the method 600 may further involve assigning one of a plurality of participation levels to the respective participant based on the trust score. The plurality of participation levels may include a full participation level during the collaboration session, a first partial participation level in which the respective participant cannot share content during the collaboration session, a second partial participation level in which the respective participant cannot share the content and cannot turn on a video during the collaboration session, and a third partial participation level in which the respective participant is a passive participant that only observes the collaboration session.

According to one or more example embodiments, the method 600 may further include tracking data relating to how each of the at least two participants joins the collaboration session, tracking one or more interactions and attributes of a participant window of each of the at least two participants during the collaboration session, terminating the collaboration session of the at least two participants and adjusting the trust score of each of the at least two participants based on the data, the one or more interactions, and the attributes of the participant window.

In one instance, the method 600 may further include terminating the collaboration session of the at least two participants and adjusting the trust score of each of the at least two participants based on a background type used in a window of the respective participant during the collaboration session.

According to one or more example embodiments, the operation 606 of performing the at least one mitigating action may include interrupting the collaboration session by removing the at least two participants from the collaboration session and connecting the at least two participants to a virtual lobby of a host of the collaboration session. The method 600 may further involve providing the trust score for each of the at least two participants In one instance, the operation 606 of performing the at least one mitigating action may include limiting participation of the participant in the collaboration session based on the trust score and excluding the participant from the collaboration session based on the trust score. The method 600 may further involve resuming the collaboration session for the at least two participants. The collaboration session may be restricted by the at least one mitigating action.

According to one or more example embodiments, the operation of obtaining the trust score may include: obtaining, from a user profile, a global trust score that reflects the history of participation in the previous collaboration sessions by the respective participant across a plurality of social platforms, and adjusting the global trust score to obtain the trust score for the collaboration session based on the authentication level of the respective participant, the geographic location, and the type of the user device of the respective participant.

Figure 7:
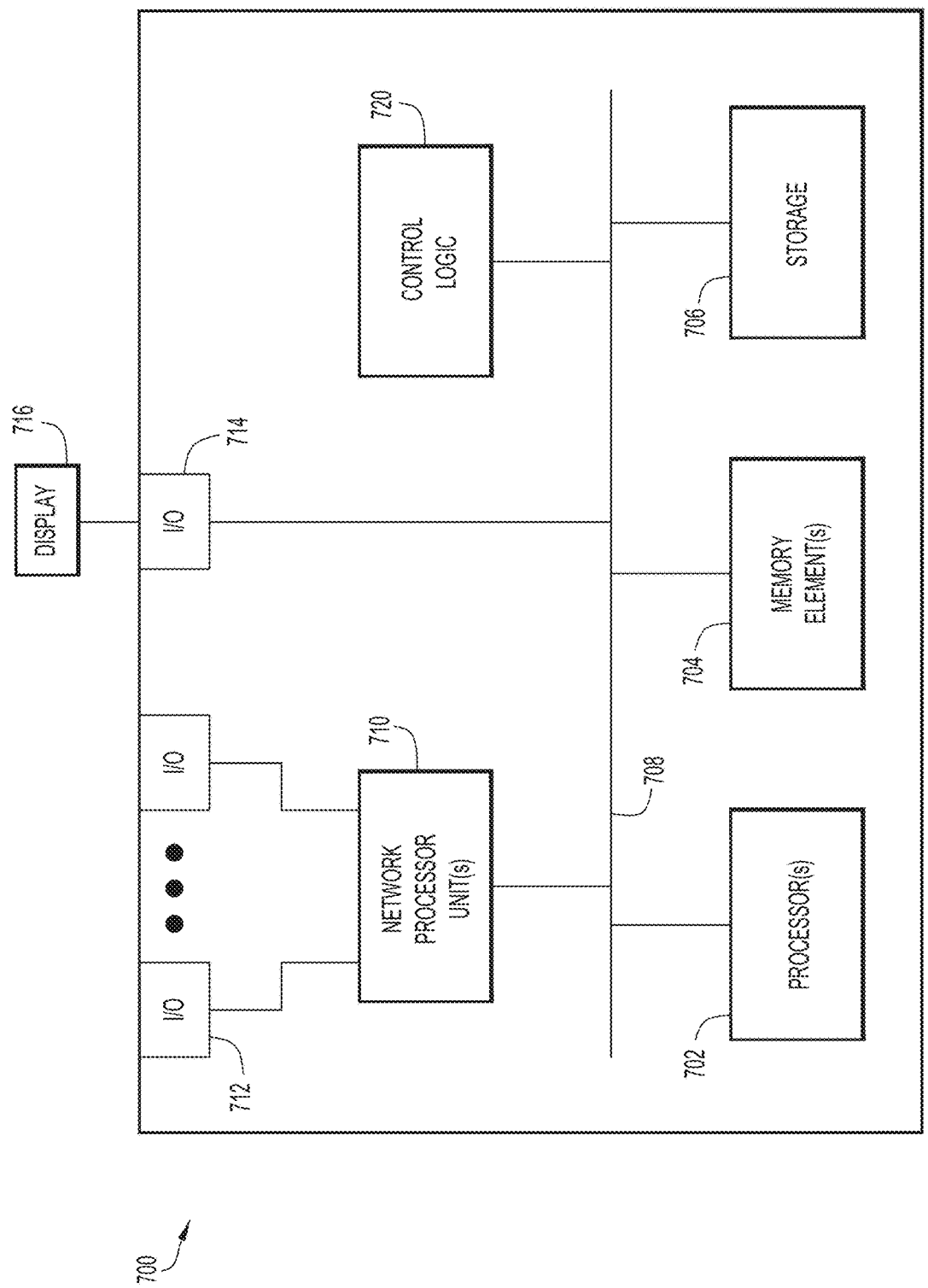
FIG. 7 is a hardware block diagram of a computing device that may perform functions associated with any combination of operations in connection with the techniques depicted and described in FIGS. 1-6, according to various example embodiments.

FIG. 7 is a hardware block diagram of a computing device 700 that may perform functions associated with any combination of operations in connection with the techniques depicted in FIGS. 1-6, according to various example embodiments, including, but not limited to, operations of the one or more user devices 102*a-f* or one or more collaboration servers 104*a-g* that are shown in FIGS. 1 and 3. Further, the computing device 700 may be representative of the trust score system 400 of FIG. 4 and/or the in-session control system 500 of FIG. 5. It should be appreciated that FIG. 7 provides only an illustration of one example embodiment and does not imply any limitations with respect to the environments in which different example embodiments may be implemented. Many modifications to the depicted environment may be made.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

[moo] In at least one embodiment, one or more memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with one or more memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor 716, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform operations including connecting at least two participants via respective user devices to a collaboration session. The operations further include detecting a violation occurring during the collaboration session. The violation indicates an inappropriate activity or content from a participant of the at least two participants. The operations further include, based on detecting the violation, performing at least one mitigating action in connection with the collaboration session.

In yet another example embodiment, one or more non-transitory computer readable storage media encoded with instructions are provided. When the media is executed by a processor, the instructions cause the processor to execute a method that includes connecting at least two participants via respective user devices to a collaboration session and detecting a violation occurring during the collaboration session. The violation indicates an inappropriate activity or content from a participant of the at least two participants. The method further includes, based on detecting the violation, performing at least one mitigating action in connection with the collaboration session.

In yet another example embodiment, a system is provided that includes the devices and operations explained above with reference to FIGS. 1-7.

The programs described herein (e.g., control logic 720) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 706 and/or memory elements(s) 704 can store data, software, code, instructions (e.g., processor instructions), logic, parameters, combinations thereof, and/or the like used for operations described herein. This includes the storage 706 and/or memory elements(s) 704 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    connecting, by a collaboration server, at least two participants via respective user devices to a collaboration session;
    detecting a violation occurring during the collaboration session, the violation indicating an inappropriate activity or an inappropriate content from a participant of the at least two participants;
    based on detecting the violation, limiting a participation level of the participant in the collaboration session without excluding the participant from the collaboration session by selecting one partial participation level of a plurality of predefined partial participation levels to limit the participation level of the participant; and
    adjusting one or more control settings of at least one of: a video stream of the participant, an audio of the participant, or sharing content by the participant, in the collaboration session based on the one partial participation level that is selected,
    wherein adjusting the one or more control settings includes restricting access to the video stream provided by the participant while allowing the audio provided by the participant based on a trust score of the participant being below a first threshold and above a second threshold, wherein the trust score of the participant is based on an activity history of the participant, and restricting the video stream and the audio provided by the participant based on the trust score of the participant being below the second threshold.

2. The method of claim 1, wherein detecting the violation includes one or more of:
    monitoring the audio during the collaboration session to detect an inappropriate utterance from the participant of the at least two participants;
    tracking content presented in the collaboration session by the at least two participants to detect an inappropriate logo or text; and
    monitoring the at least two participants and respective participant windows to detect an inappropriate gesture, sign, or image.

3. The method of claim 2, further comprising:
    defining at least one control policy for the collaboration session, the at least one control policy specifies one or more of: a plurality of participant activities, a plurality of images, textual content, and data not allowed during the collaboration session,
    wherein detecting the violation includes detecting an occurrence of an activity or data during the collaboration session that satisfies the at least one control policy.

4. The method of claim 1, further comprising:
    terminating, by the collaboration server, the collaboration session; and
    adjusting the trust score assigned to each of the at least two participants based on one or more activities of a respective participant during the collaboration session.

5. The method of claim 1, further comprising:
    obtaining the trust score for each of the at least two participants, wherein the trust score is generated based on one or more of: an authentication level of a respective participant of the at least two participants, a geographic location, a type of a user device of the respective participant, and history of participation in previous collaboration sessions by the respective participant.

6. The method of claim 5, further comprising:
    assigning one of a plurality of participation levels to the respective participant based on the trust score, wherein the plurality of participation levels include:
        a full participation level during the collaboration session,
        a first partial participation level in which the respective participant is restricted from sharing first content during the collaboration session while the respective participant is permitted to turn on a video to provide a first video stream of the respective participant and the audio to provide a first audio of the respective participant during the collaboration session, a second partial participation level in which the respective participant is restricted from turning on the video during the collaboration session, and a third partial participation level in which the respective participant is a passive participant that only observes the collaboration session without sharing the first content and without turning on the video and the audio.

7. The method of claim 5, further comprising:
tracking data relating to how each of the at least two participants joins the collaboration session;
tracking one or more interactions and attributes of a participant window of each of the at least two participants during the collaboration session;
terminating the collaboration session of the at least two participants; and
adjusting the trust score of each of the at least two participants based on the data, the one or more interactions, and the attributes of the participant window.

8. The method of claim 5, further comprising:
terminating the collaboration session of the at least two participants; and
adjusting the trust score of each of the at least two participants based on a background type used in a window of the respective participant during the collaboration session.

9. The method of claim 5, wherein obtaining the trust score includes:
obtaining, from a user profile, a global trust score that reflects the history of participation in the previous collaboration sessions by the respective participant across a plurality of social platforms, and
adjusting the global trust score to obtain the trust score for the collaboration session based on the authentication level of the respective participant, the geographic location, and the type of the user device of the respective participant.

10. The method of claim 1, wherein selecting the one partial participation level from the plurality of predefined partial participation levels includes:
assigning the one partial participation level to the participant, wherein the one partial participation level is selected from a first partial participation level in which the participant is restricted from sharing the content during the collaboration session while being permitted to turn on a video and the audio during the collaboration session, a second partial participation level in which the participant is restricted from turning on the video during the collaboration session, and a third partial participation level in which the participant observes the collaboration session without sharing the content and without turning on the video and the audio.

11. The method of claim 1, further comprising:
presenting a visual indication, to a host of the collaboration session, identifying the participant that triggered the violation; and
obtaining input, from the host, selecting the one partial participation level from the plurality of predefined partial participation levels to limit the participation level of the participant, wherein limiting the participation level of the participant in the collaboration session is further based on the input.

12. The method of claim 1, wherein selecting the one partial participation level from the plurality of predefined partial participation levels is based on one or more control policies that include a plurality of mitigating actions that vary based on a type of the violation.

13. A method comprising:
connecting, by a collaboration server, at least two participants via respective user devices to a collaboration session;
detecting a violation occurring during the collaboration session, the violation indicating an inappropriate activity or an inappropriate content from a participant of the at least two participants;
based on the violation being detected, interrupting the collaboration session by removing the at least two participants from the collaboration session and connecting the at least two participants to a virtual lobby of a host of the collaboration session;
identifying the participant that triggered the violation from among the at least two participants;
displaying the at least two participants in the virtual lobby including the participant that triggered the violation being visually identified in the virtual lobby;
adjusting a trust score of the participant based on the violation, wherein the trust score is based on a behavioral history of the participant; and
adjusting one or more control settings by restricting access to a video stream provided by the participant while allowing an audio provided by the participant based on the trust score of the participant being below a first threshold and above a second threshold and restricting the video stream and the audio provided by the participant based on the trust score of the participant being below the second threshold.

14. The method of claim 13, further comprising:
obtaining, from the host, input indicating whether to limit participation of the participant in the collaboration session or to exclude the participant from the collaboration session; and
resuming the collaboration session for the at least two participants, wherein the collaboration session is restricted based on the input.

15. The method of claim 13, wherein resuming the collaboration session for the at least two participants includes:
excluding, by the collaboration server, the participant from the collaboration session, or limiting, by the collaboration server, access of the participant to one or more of: a video stream of the collaboration session, an audio of the collaboration session, content of the collaboration session, or metadata of the collaboration session.

16. The method of claim 13, further comprising:
obtaining a respective trust score for each of the at least two participants, wherein the respective trust score is generated based on one or more of: an authentication level of a respective participant of the at least two participants, a geographic location, a type of a user device of the respective participant, and history of participation in previous collaboration sessions by the respective participant; and
providing the respective trust score for each of the at least two participants.

17. The method of claim 16, further comprising:
resuming the collaboration session for the at least two participants other than the participant, wherein the collaboration session is restricted by limiting a participation level of one or more participants of the at least two participants in the collaboration session based on the respective trust score being below a first predetermined threshold value.

18. An apparatus comprising:
a memory;
a network interface configured to enable network communications; and
a processor, wherein the processor is configured to perform operations comprising:
 connecting at least two participants via respective user devices to a collaboration session;
 detecting a violation occurring during the collaboration session, the violation indicating an inappropriate activity or an inappropriate content from a participant of the at least two participants;
 based on detecting the violation, limiting a participation level of the participant in the collaboration session without excluding the participant from the collaboration session by selecting one partial participation level of a plurality of predefined partial participation levels to limit the participation level of the participant; and
 adjusting one or more control settings of at least one of: a video stream of the participant, an audio of the participant, or sharing content by the participant, in the collaboration session based on the one partial participation level that is selected,
 wherein adjusting the one or more control settings includes restricting access to the video stream provided by the participant while allowing the audio provided by the participant based on a trust score of the participant being below a first threshold and above a second threshold, wherein the trust score of the participant is based on an activity history of the participant and restricting the video stream and the audio provided by the participant based on the trust score of the participant being below the second threshold.

19. The apparatus of claim 18, wherein the processor is configured to detect the violation by performing one or more of:
 monitoring the audio during the collaboration session to detect an inappropriate utterance from the participant of the at least two participants;
 tracking content presented in the collaboration session by the at least two participants to detect an inappropriate logo or text; and
 monitoring the at least two participants and respective participant windows to detect an inappropriate gesture, sign, or image.

20. The apparatus of claim 18, wherein the processor is further configured to perform:
 terminating the collaboration session; and
 adjusting the trust score assigned to each of the at least two participants based on one or more activities of a respective participant during the collaboration session.

21. The apparatus of claim 18, wherein the processor is further configured to perform:
 obtaining the trust score for each of the at least two participants, wherein the trust score is generated based on one or more of: an authentication level of a respective participant of the at least two participants, a geographic location, a type of a user device of the respective participant, and history of participation in previous collaboration sessions by the respective participant.

22. The apparatus of claim 21, wherein the processor is further configured to perform:
 assigning one of a plurality of participation levels to each participant of the at least two participants based on the trust score, wherein the plurality of participation levels include:
  a full participation level during the collaboration session,
  a first partial participation level in which the respective participant is restricted from sharing content during the collaboration session while the respective participant is permitted to turn on a video and the audio during the collaboration session,
  a second partial participation level in which the respective participant is restricted from turning on the video during the collaboration session, and
  a third partial participation level in which the respective participant is a passive participant that only observes the collaboration session without sharing the content and without turning on the video and the audio.

23. The apparatus of claim 21, wherein the processor is further configured to perform:
 tracking data relating to how each of the at least two participants joins the collaboration session;
 tracking one or more interactions and attributes of a participant window of each of the at least two participants during the collaboration session;
 terminating the collaboration session of the at least two participants; and
 adjusting the trust score of each of the at least two participants based on the data, the one or more interactions, and the attributes of the participant window.

24. The apparatus of claim 18, wherein the processor is further configured to perform:
 presenting a visual indication, to a host of the collaboration session, identifying the participant that triggered the violation; and
 obtaining input, from the host, selecting one of a plurality of partial participation levels to limit the participation level of the participant, wherein limiting the participation level of the participant in the collaboration session is based on the input.

* * * * *